Feb. 9, 1971  J. P. SMITH  3,562,643

SPRING LOADED TEST PROBE ASSEMBLY

Filed Jan. 21, 1969

INVENTOR
JAMES P. SMITH

BY
Barlow & Barlow
ATTORNEYS

United States Patent Office 3,562,643
Patented Feb. 9, 1971

3,562,643
SPRING LOADED TEST PROBE ASSEMBLY
James P. Smith, Woonsocket, R.I., assignor to Ostby & Barton Co., a corporation of Rhode Island
Filed Jan. 21, 1969, Ser. No. 792,336
Int. Cl. G01r 31/02
U.S. Cl. 324—72.5    4 Claims

ABSTRACT OF THE DISCLOSURE

A spring loaded contact assembly having a barrel for fitting into the opening in a test board with a terminal fixed to and extending from one end of the barrel and a plunger terminal slidable in the barrel and protruding from the opposite end. A spring acts between the fixed terminal and plunger terminal urging the latter outwardly of the barrel while the plunger terminal is arranged to have an axially deflectable tip for movement lateral of its axis under pressure and of such resilience that the tip of the plunger will move back into axial alignment with the plunger terminal when pressure thereon is released.

BACKGROUND OF THE INVENTION

Spring loaded contact assemblies (test probes) are used extensively in the electronic industry in testing printed circuit boards, integrated circuits, terminal testing boards and many other applications. A spring loaded contact is made up basically of four major parts; a terminal, a barrel, a plunger and a spring. Oftentimes, a tip is also soldered to the end of the plunger. The plunger is connected to one end of the spring and the terminal to the other by a solder joint, mechanical means, or merely by the pressure of the spring. The terminal, spring and plunger sub assembly is then assembled into the barrel which is crimped to hold it therein. The exact diameter, length, spring pressure, plunger configuration, terminal configuration, material and plating required is dependent upon the particular application. In a test application, the contacts are mounted in a test board arranged in the pattern which is to be tested. When the test board is brought into contact with the circuit to be tested, the plunger depresses into the barrel. This spring compression of the plunger keeps constant pressure against the circuit board hole, terminal, or solder joint where electrical contact is to be made and also takes up any variation in the height of tested points. When testing printed circuit board holes or terminal boards, one of the most serious disadvantages in using contact assemblies is mis-alignment. Where one may be attempting to test several hundred holes or terminals simultaneously, inherent variations in hole or terminal locations will cause the contact plunger to bend due to misalignment, especially in the smaller sizes, which oftentimes renders the entire test fixture useless. This causes considerable downtime and many times expensive repairs to test equipment.

SUMMARY OF THE INVENTION

The contact comprises a barrel of a size to fit in the opening of a test board with a spring in the barrel electrically connecting a fixed terminal at one end and a plunger at the other end, the spring urging the plunger outwardly to its limit by means of a shoulder on the plunger engaging the crimped-in edge of the barrel. The plunger outside of the barrel will have a contact end which will be arranged for deflection laterally of the axis either by the plunger being inherently laterally resilient or by means of a spring interposed between the ends of the plunger in a tip with the resilience occurring at the spring connecting the two parts.

DESCRIPTION OF THE PREFERRED EMBODIMENTS

Figure 1:
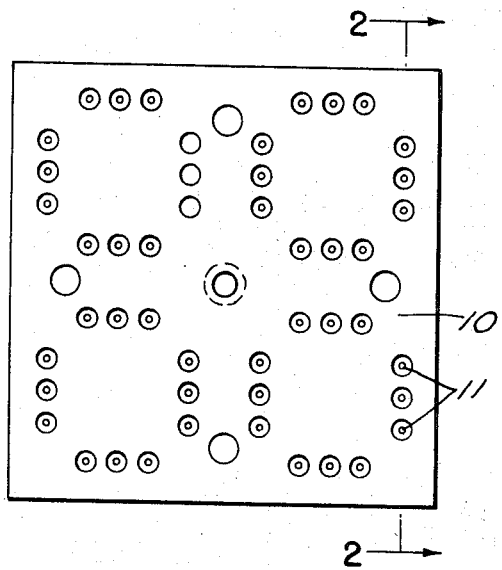
FIG. 1 is a plan view of a printed circuit board having openings therein in a pattern which may be suitable for one particular apparatus to be tested, the wiring being eliminated for clarity.
Figure 2:
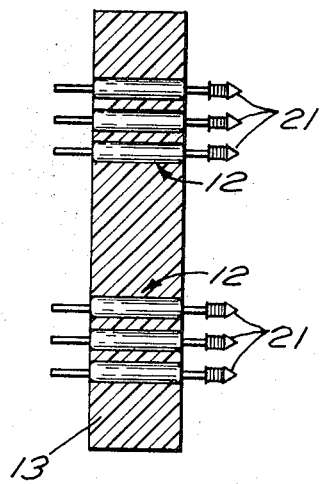
FIG. 2 is a section of a test board showing the spring loaded contacts in position.

A printed circuit board is shown at 10 with a plurality of openings 11 therein into each one of which an electronic component may be wired and into which a spring loaded contact designated 12 may be inserted as shown in FIG. 2 for continuity testing. For this purpose the contacts 12 are placed in a suitable arrangement in an insulated test board 13.

The spring loaded contact 12 comprises a fixed terminal 15 and a plunger 16 with a helical spring 17 having one end convolution soldered to the fixed terminal 15 as at 18 and the other end convolution soldered to the plunger 16 as at 19. The outer end of the plunger 16 is enlarged as at 20, and a separate tip 21, pointed at its end and of generally conical shape, has is base portion 22 soldered at 24 to an end of a helical spring 23, while the opposite end of the helical spring is soldered at 25 to the enlarged portion 20.

This assembly of terminal 15, plunger 16 and spring 17 is then enclosed in a barrel designated generally 30, the plunger being slidable therein with a rdeuced portion 31 providing a shoulder 32 which will engage the crimped-in ends 33 of the barrel to limit the outward movement of the plunger under influence of its spring acting between the fixed terminal 15 and the plunger. The fixed terminal is recessed as at 34 and the end of the barrel is crimped into this recess as at 35 so as to fix the terminal 15 therein. A bore 36 is in the end of the fixed terminal for a wire connection thereto. The barrel of the plnuger is inserted in an opening of the test board 13 and other contacts 12 are likewise inserted in other openings in the test board.

In some cases instead of having a helical coil spring such as 23, the plunger outwardly of the barrel is reduced in diameter sufficiently to be resiliently flexible and may deflect laterally of the axis without exterting detrimental strain on the portion of the plunger in the barrel or permanently bending the shaft portion. It is equipped with a tip 21' similar to the tip in FIG. 3.

Should the positioning of the printed circuit board 10 result in contact 12 being slightly out of line with opening 11 when board 13 is brought toward board 10, the tip 21 may move laterally without injuring the spring contact assembly and still maintain its good contact for testing purposes as the board is in use. In all cases the variation in distance between boards 10 and 13 is taken up by compression of spring 17.

Figure 3:
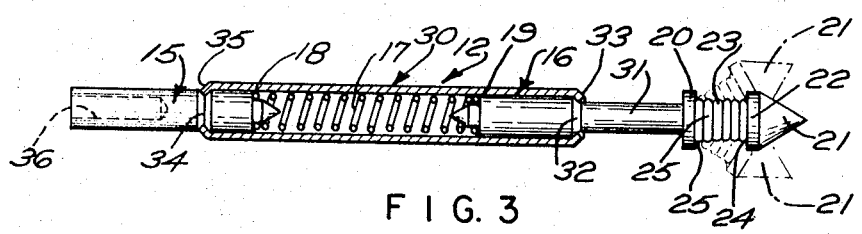
FIG. 3 is a sectional view on a larger scale of the contact assembled.
Figure 4:
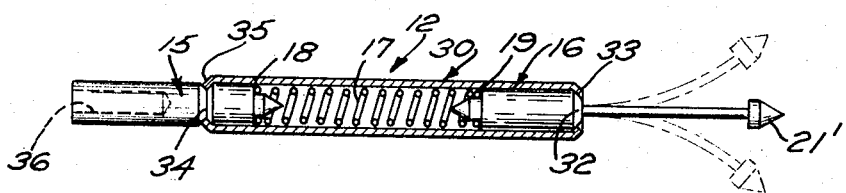
FIG. 4 is a vnew similar to FIG. 3 illustrating a modified form of plunger.
Figure 5:
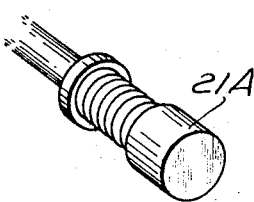
FIGS. 5, 6, 7 and 8 are fragmentary perspective views of alternate tip configurations.
Figure 6:
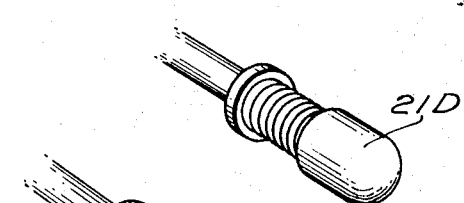
Figure 8:
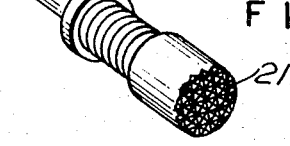
Figure 7:
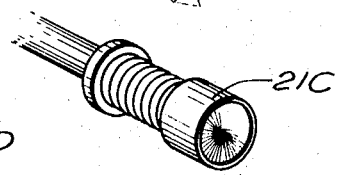

FIGS. 5 to 8 illustrate other tip configurations which may be used in lieu of the conical shape shown in FIGS. 2, 3 and 4. FIG. 5 shows a flat face tip 21A and FIG. 8 alternates the flat face with a knurl face tip 21B. The FIG. 7 tip 21C has a face with a countersink or conical depression and the FIG. 6 tip 21D has a spherical dome end. Each tip has its preferred use, for example, the conical tip 21 is for testing hole patterns, the spherical dome tip 21D for flat surfaces, the countersink tip 21C for testing pins or leads, and the knurled face tip 21B for producing a slight cutting (wiping) action. In fact each of the designs shown will produce a wiping action as they contact the requisite test point mostly as a result of a sliding action.

I claim:

1. An electrical testing device comprising a test board having a plurality of spring loaded test probes mounted therein with their longitudinal axes being parallel and laterally spaced in a predetermined pattern, said spring loaded test probes each comprising a hollow barrel mounted in said test board, a terminal fixed to one end of said barrel, a plunger axially slidable in said barrel and protruding through the other end of the barrel, an electrical conducting spring in said barrel connecting said terminal and plunger and urging said plunger outwardly of the barrel, said plunger comprises a rigid shaft portion which protrudes outwardly from within said barrel and a tip portion, said tip portion being physically and electrically connected to said rigid shaft by a helical spring whereby the tips of test probes may be resiliently deflected laterally to compensate for misalignment of the test probes on the testing board with the pattern of terminals to be contacted.

2. An electrical testing device as recited in claim 1 wherein the tip portion of the plunger has a conical face.

3. An electrical testing device as recited in claim 1 wherein the tip portion of the plunger has an inverted conical face.

4. An electrical testing device as recited in claim 1 wherein the tip portion of the plunger has a spherical dome face.

References Cited

UNITED STATES PATENTS

| | | | |
|---|---|---|---|
| 1,454,623 | 5/1923 | Carter | 324—72.5UX |
| 2,922,954 | 1/1960 | Bigelow | 324—158 |

OTHER REFERENCES

IBM Technical Disclosure Bulletin, vol. 8, No. 4, September 1965, pages 661–2.

RUDOLPH V. ROLINEC, Primary Examiner

R. J. CORCORAN, Assistant Examiner